(12) United States Patent
Buhler et al.

(10) Patent No.: US 8,369,980 B2
(45) Date of Patent: Feb. 5, 2013

(54) METHOD OF OPERATING A MACHINE TOOL, A MACHINE TOOL SYSTEM AND COMPONENTS THEREOF

(75) Inventors: Ernst Buhler, Losone (CH); Franck Besson, Fillinges (FR); Rino D'Amario, Sigirino (CH); Nicola Giandomenico, Troinex (CH); Reto Knaak, Ascona (CH); Rosario Lombardo, Cannobio (IT); Marco Boccadoro, Verscio (CH)

(73) Assignees: AGIE SA (CH); Charmilles Technologies SA (CH)

( * ) Notice: Subject to any disclaimer, the term of this patent is extended or adjusted under 35 U.S.C. 154(b) by 1530 days.

(21) Appl. No.: 11/496,340

(22) Filed: Jul. 31, 2006

(65) Prior Publication Data

US 2007/0027570 A1   Feb. 1, 2007

(30) Foreign Application Priority Data

Aug. 1, 2005 (EP) ..................................... 05016699

(51) Int. Cl.
 *G06F 19/00* (2011.01)
(52) U.S. Cl. ....................... 700/162; 700/169; 219/69.11
(58) Field of Classification Search .................... 700/19, 700/22, 162, 169; 219/69.11
See application file for complete search history.

(56) References Cited

U.S. PATENT DOCUMENTS

| | | | |
|---|---|---|---|
| 4,361,745 A * | 11/1982 | Rupert et al. | 219/69.16 |
| 4,426,613 A * | 1/1984 | Mizuno et al. | 322/21 |
| 4,614,854 A * | 9/1986 | Obara et al. | 219/69.13 |
| 4,710,603 A * | 12/1987 | Obara | 219/69.13 |
| 4,766,281 A | 8/1988 | Buhler et al. | |
| 4,903,213 A * | 2/1990 | Buhler et al. | 700/189 |
| 5,262,921 A * | 11/1993 | Lamers | 361/699 |
| 5,339,249 A * | 8/1994 | Schaeffer | 700/176 |
| 5,404,288 A | 4/1995 | McDunn | |
| 5,453,933 A | 9/1995 | Wright et al. | |
| 5,624,347 A * | 4/1997 | Yang | 477/5 |
| 5,808,261 A * | 9/1998 | Berger et al. | 219/69.11 |
| 6,080,953 A | 6/2000 | Banzai et al. | |
| 6,552,525 B2 * | 4/2003 | Bessler | 324/103 R |
| 6,988,161 B2 * | 1/2006 | McConnell et al. | 710/316 |
| 2003/0233164 A1 * | 12/2003 | Maeda | 700/180 |
| 2006/0054602 A1 * | 3/2006 | Kidokoro et al. | 219/121.61 |

FOREIGN PATENT DOCUMENTS

| | | |
|---|---|---|
| EP | 0 509 817 A | 10/1992 |
| EP | 698 440 B1 | 7/2000 |

* cited by examiner

*Primary Examiner* — Mohammad Ali
*Assistant Examiner* — Sheela S Rao
(74) *Attorney, Agent, or Firm* — Harness, Dickey & Pierce, P.L.C.

(57) ABSTRACT

A method of operating a machine tool, e.g., an electrical discharge machine, and a machine tool system with a machine, e.g. an electrical discharge machine, for machining a workpiece may include numerous configurable modules (DRIVE; GEN; CONTROL) to perform at least one of controlling, monitoring and carrying out of the machining of a workpiece. The modules (DRIVE; GEN; CONTROL) are arranged on the machine and are linked by a data network to a node for at least one of sending data to the node and receiving data from the node.

50 Claims, 9 Drawing Sheets

METHOD OF OPERATING A MACHINE TOOL, A MACHINE TOOL SYSTEM AND COMPONENTS THEREOF

FIELD OF THE INVENTION

The invention relates generally to the field of machine tools, and more specifically the invention relates to a method of operating a machine tool, to a machine tool system, such as an electrical discharge machining (EDM) system and other like machine tools, as well as to components thereof, such as, for instance, a generator module and a driver unit.

BACKGROUND OF THE INVENTION

Future concepts of electrical discharge machines and other types of machine tools need to be more flexible in satisfying current demands better and quicker, and in simplifying the implementation of any function concerned. The production, testing and maintenance of machine tool systems need to be compatible on an international scale. Necessary for this purpose are reduced material and production costs and as many of the system components as possible need to be suitable for use, for example, in wire-cutting as well as die-sinking EDM machine systems, despite the differences in the requirements. In addition, the same modules need to be suitable for use in high-end and low-cost products. Apart from this, standardized diagnostic routines are desirable to simplify verification of increasingly complex functions.

The increasing demands on still higher productivity and flexibility of, for example, an EDM machine is also forcing the power requirement of pulse generators even higher, whilst, on the other hand, the losses in pulse generation need to be minimized. In keeping with enhanced environmental compatibility the losses of an EDM machine or other machine tool when not in operation also need to be further reduced.

FIG. 2 shows the general configuration of a prior art die-sinking EDM machine. A wire-cutting EDM machine differs from the die-sinking EDM machine actually only in details, but nevertheless most manufacturers make use of totally different concepts for implementation and operation the two types of EDM machines. This applies particularly to the pulse generator involved, where very short but high discharge pulses are needed for wire-cutting, whilst for die-sinking longer discharge pulses of corresponding lower amplitude are used. To date there is still no satisfactory solution for a consistent overall concept.

The configuration of the EDM machine system of FIG. 2 generally involves the following sub-systems or sections: a main power input 1, an electronics cabinet 2, a cable system 3 and a machine 4, i.e. the die-sinking machine as such that carries out the machining of a workpiece. The power cabinet 2 houses an AC voltage module (AC), a DC voltage module (DC), a numerical control (CNC), one or more drive modules (DRIVE), a generator module (GEN) as well as a universal machine control module (CONTROL). Since the full content of the power cabinet 2 is considerably bulky and weighty and the total power loss is of the order of a single-digit kW, the power cabinet 2 is normally sited some distance away from the machine 4. Further, the cabling 3 is usually 2 m to 5 m long. A first cable connects the drive modules (DRIVE) to the axis drive motors of the machine 4 and supplies the motor current, the current for any brakes, as may be provided, as well as diverse sensitive digital signals of the position transducers. These cables are a significant cost factor and if not designed and installed and with due care can easily result in expensive downtime.

A second cable connects the generator module (GEN) to the workpiece to be machined and to an electrode tool of the machine 4. This second cable has the disadvantage that the power losses, particularly in wire-cutting, due to the high effective value of the pulse current, may be as high as 100 W/m. Apart from this undesirable waste of energy this can also result in the machine structure becoming deformed from the heat and thus to workpiece inaccuracies. Currently, the only solution to this problem is a complicated means of water cooling.

Another disadvantage is also involved in the high rigidity of the cables used, typically needing to involve eight coaxial cables in parallel, each of approximately 5 mm$^2$ cross section of copper. Since the cables are connected to moving structure parts of the machine, their rigidity results in flexing of these structure parts in the micrometer range and thus, of course, to corresponding errors in workpiece machining. Still further, the length of the cables determines their capacity. The energy stored in each cable is also discharged at the working gap such that the achievable roughness of the workpiece is limited.

A third cable serves to connect the universal machine control module (CONTROL) to a large number of function units on the machine 4, such as electrovalves, pumps, auxiliary drives, end switches, temperature sensors, safety guards, etc. This third cable likewise results in considerably costs because a great many different conductors are needed, but also because each machine variant needs ultimately a special cable. A further disadvantage may materialize when the machine 4 and the power cabinet 2 are shipped separately to the customer, the many connections of the cable system 3 required on installation constituting an added fault risk.

In the "Proceedings of the 13$^{th}$ ISEM", Vol. 1, Bilbao 2001, pages 3 to 19, MASUZAWA, all processes and equations fundamental to pulse generation via pulse capacitors are explained as regards their application in micro EDM. These comments apply in general and thus also to the present invention.

U.S. Pat. No. 4,710,603 (OBARA) discloses a generator for an EDM machine operating on the pulse capacitor discharge principle, the basic circuit of which is shown in FIG. 3 of this application. From a DC voltage source E a capacitor C1 is charged via a switching element Q1 and an inductance L3. A further switching element Q2 discharges the pulse capacitor C1 via a further inductance L2 into the spark gap PW. This is circuit requires neither charge resistors nor switching elements in linear operation.

U.S. Pat. No. 4,766,281 (BÜHLER) discloses an EDM machine generator with a passive charge voltage regulator, as shown in FIG. 4 of this application. The charge voltage regulator comprises a flyback converter transformer and two diodes. The efficiency of this generator is high since the commutation losses as occur with the generator as it reads from U.S. Pat. No. 4,710,603 across the switching element Q1 are eliminated.

However, both these generators still have disadvantages. Firstly, the pulse frequency is restricted to modest values of around 70 kHz due to monopolar charging. Increasing the frequency further would allow the charge current to increase to values detrimenting the efficiency. Secondly, the generators are still too large to permit their location e.g. in the direct vicinity of the electrode. For a more detaned explanation of this, reference is made to FIG. 5 plotting for these generators the curves of the capacitor voltage Uc and pulse current Igap at the spark gap as a function of time t. It is evident that for a sinusoidal pulse current Igap the negative charge voltage U_chrg flips cosinusoidally to a positive residual charge voltage U_end. This residual charge voltage U_end corresponds precisely to the energy which is not converted in the spark gap and reflected back to the pulse capacitor. Ignoring the line losses the residual charge voltage as it reads from the aforementioned Proceedings of the 13th ISEM Vol. 1, Bilbao 2001, pages 3 to 19 is:

$$U\_end = -U\_chrg + 2*U\_gap$$

wherein U_gap corresponds to the voltage across a spark gap formed between a machining electrode and the workpiece. The residual voltage U_end is accordingly a function of neither the pulse current nor of the capacitance of the pulse capacitor, nor of the inductance of the discharge circuit. After a discharge the charge voltage regulator immediately commences to recharge the pulse capacitor again to the desired negative charge voltage U_chrg. In this arrangement, the complete electrical energy of the residual charge voltage U_end is converted within an inductance (e.g. within the coil L3 in FIG. 3 or within the flyback converter transformer in FIG. 4) firstly into magnetic energy, before then being stored again in form of electrical energy in the pulse capacitor in reverse polarity.

EP 698 440 B1 (KANEKO) discloses an EDM power supply system wherein a pulse transformer 13 (in FIG. 1 KANEKO) together with the switching contacts 14A to 14D are housed in a separate case 12 in the vicinity of the spark gap 1, 3. In this arrangement the pulse transformer 13 can be switched active or passive by the switching contacts 14A to 14D. This device is provided for wire-cutting machines for generating bipolar pulses via the pulse transformer 13 and thus to reduce wire vibration in "second cutting". However, this known generator is still too bulky and subject to high losses, this being the reason why power cables 11, 17 with the discussed disadvantages are still needed for pulse communication from the generator module to the machine.

U.S. Pat. No. 6,080,953 (BANZAI) proposes a modular generator arranged directly surrounding the wire electrode of a wire-cutting machine and cooled by the machining fluid (water) with the intention of reducing the inductance in the working space. Otherwise, the configuration of wire-cutting generators having a proven record of success is adapted and for die-sinking the proposals fail to apply in any case. Still of a disadvantage is the additional power loss in the single-digit kW range which is dissipated via the flushing medium in the work container of the machine, resulting in an undesirable temperature increase in the working space as a whole and thus in problems as to thermal stability which consequently may result in loss of accuracy in machining. Directly immersing the generator modules in the machining fluid as also proposed is unfavorable, because of it accelerating soilage in thus reducing the cooling capacity. Potting the generator modules in a mixture of metal powder and resin likewise proposed to improve heat dissipation also result in problems. Although a metal powder could be processed to produce an electrical insulation, the metal powder will form parasitic capacitances to all components of the generator, resulting in high-frequency dissipation currents into the case and other components. Such a generator would thus be hampered by multiple disturbances. There is also a problem with a potted generator module being impossible to repair, apart from it being extremely difficult to separate these into their individual components for environment compatible disposal.

The aforementioned prior art proposals are thus not suitable in solving the problem for an effective conception of an electrical discharge machining system and other like machine tools.

The present invention is intended to solve this problem in presenting an effective overall concept for a method of operating a machine tool as well as an overall concept for a machine tool system and its manufacturing, in particular for an electrical discharge machining system.

SUMMARY OF THE INVENTION

A first aspect of the present invention is directed to a method of operating a machine tool, e.g., an electrical discharge machine, for machining a workpiece, wherein at least one of controlling, monitoring and carrying out of the machining of the workpiece is performed by a plurality of configurable modules, said modules are arranged on the machine, and said modules are so linked by a data network to a node or node station for sending data to said node and/or for receiving data from said node.

According to a second aspect the node is adapted to manage data transfer to or from said at least one module for at least one of controlling and monitoring said module.

Another aspect of the present invention is directed to an method of generating machining pulses for electrical discharge machining by means of discharging pulse capacitors, based on the above method of operating the electrical discharge machine.

Still another aspect of the present invention is directed to a machine tool system, e.g. an electrical discharge machining system, comprising a machine for machining a workpiece wherein at least one of controlling, monitoring and carrying out of the machining of the workpiece is performed by a plurality of configurable modules, said modules are arranged on the machine, and said modules are so linked by a data network to a node or node station for at least one of sending data to said node and receiving data from said node.

Still another aspect of the present invention is directed to a generator module for an electrical discharge machining system for generating pulses by means of discharging pulse capacitors, said generator module comprising: a data link to said node which also provides a feed voltage, a programmable controller, a bipolar current source, at least one charge and discharge circuit for at least one pulse capacitor comprising a sensor, and one or more inverter circuits including one or more isolating transformer(s).

Still another aspect of the present invention is directed to a driver unit for a machine tool, further comprising a drive module with a motor forming an assembly.

Further aspects are set forth in the dependent claims, the following description and the drawings. Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which.

DESCRIPTION OF THE PREFERRED EMBODIMENTS

Figure 1:
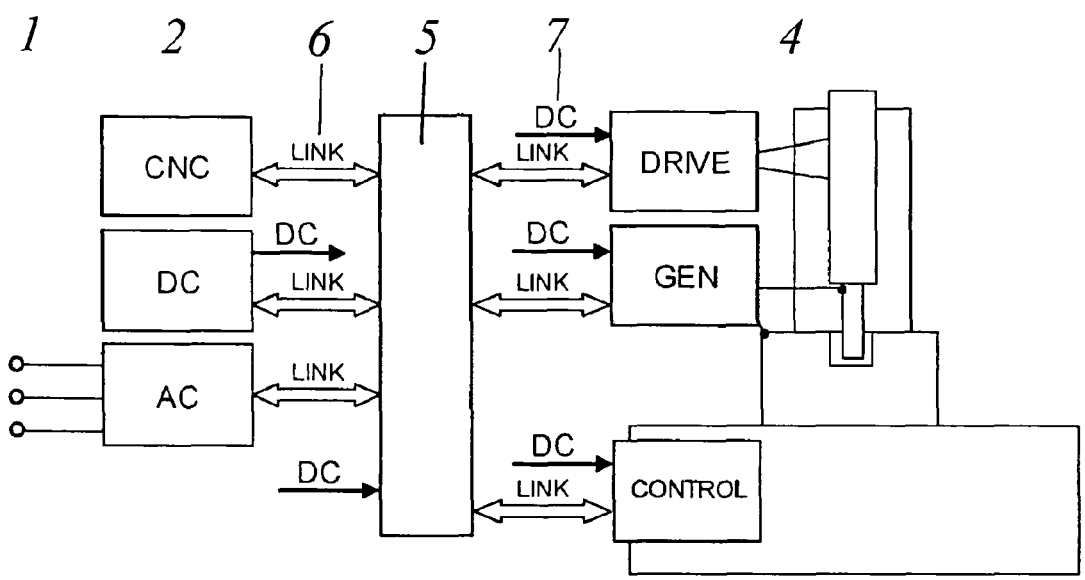
FIG. 1 is a schematic view of a die-sinking EDM machine in accordance with an embodiment of the invention.

Before proceeding further with the detailed description of FIGS. 1 and 6-18, however, a few items of the preferred embodiments will be discussed.

Some of embodiments relate to a method and modules for electrical discharge machining wherein the different functions of, e.g., generator, measuring systems, axis drives, dielectric unit control, mains input control, numerical control, etc., are organized in respective modules which are linked to a centralized node or node station. In some of these embodiments, as compared to prior art systems, the invention sophisticates the methods for operation and concept of an electrical discharge machining system so that the modules for building up the system can be miniaturized to such an extent that can now be sited in the machine itself where best suitable for satisfying the respective functions. For this purpose the modules feature optimized effectiveness by avoiding waste of energy. For example, the cable losses and wiring costs are minimized. In general, production, operation and later disposal of the modular concept according to the embodiments of the invention better comply with current ecological and economical criteria.

According to an embodiment of an generator module for an electrical discharge machine, the pulse generation is rendered scalable over a wide range of performance and the structure is configurable so that variants and modifications are possible for any application without undue complications. This embodiment achieves defining an effective overall concept for methods of pulse generation and pulse generators as well as operation thereof, in satisfying the cited requirements whilst avoiding the disadvantages of known achievements of the prior art as aforementioned.

According to an embodiment of a method of generating machining pulses for electrical discharge machining by means of discharging pulse capacitors, use is made of a novel bipolar charging principle in which the energy consumed by a pulse in a pulse capacitor is merely supplemented for the next pulse without, as is known, inverting the polarity of the voltage at the pulse capacitor. Preferably, for this purpose use is made of a bipolar current source and switching elements are provided to connect the correct polarity to a pulse capacitor. The desired polarity of the pulses is subsequently accomplished by an inverter circuit further including an isolating transformer for DC decoupling. The high flexibility of this circuit now permits applications other than pulse generation for electrical discharge machining, such as e.g., for high-dynamic axis drives with DC or AC motors. A further embodiment involves application for high-frequency motors for driving the spindles of milling machines and lathes or for high-pressure pumps as, for example, required for flushing the spark gap and for the filter assemblies in an EDM machine.

According to a further embodiment the concept of standardized interfaces and/or communication protocols between the central node and the modules may reduce cable system complexity whilst enhancing flexibility and diagnostic routine performance. Preferably, providing a limited power supply to the at least one of the modules is now possible via the standardized interface in thus e.g. maintaining communication even when a fault occurs. Standardized interfaces for powering high performance modules further reduce costs and losses.

In accordance with a further embodiment the invention teaches interlinking like or similar modules which now merely need to be configured for a specific task and which thanks to their miniaturization can now be sited directly where required. A further embodiment involves smart application of low cost semiconductor switching elements with a simultaneous consequential reduction or even elimination of losses of all kinds.

According to another embodiment a method of operating an electrical discharge machine for machining a workpiece a is proposed wherein the main functions of machine are modulized and the modules sited where satisfying their functions in the machine and the modules being interlinked to the central node station by data links, the modules being controlled and monitored via the node station.

Some of the embodiments are just as suitable for all electrical discharge machining tasks as for the power supply of motors in machine tools in general. For example, the a generator module in accordance with an embodiment can be transformed, e.g., from a die-sinking EDM generator into a wire-cutting EDM generator or a motor drive by a software configuration instruction communicated to the configurable module. In another embodiment selecting the polarity of the pulses is done electronically and can thus alternate during a pulse or differ from pulse to pulse in opening up novel technological horizons for the user. Thanks to the low power loss and elevated operating frequency the modules can now be miniaturized for optimum siting in the machine. Pulse performance is now no longer detrimented by the cable system whilst the power losses in DC communication for a high voltage are now very much smaller.

In accordance with yet another embodiment the modular concept permits the application of modern automated production methods for mass production of the modules, resulting in a tidy reduction in costs. For example, the surface mount technology (SMT) method of production is based on the automated componenting of printed circuits with non-wired surface mounted devices (SMD). In this embodiment the main field of application is thus the generation of well-defined and reproducible power pulses of all kinds, preferably with high efficiency.

The aforementioned embodiments of FIGS. 1 and 6-18 will now be described in detail:

Referring now to FIG. 1 there are illustrated the salient assemblies of a modular die-sinking machining system. This arrangement too can be divided for a better overview into various subsystems which in turn are divided into various modules: a main power input 1, an electronics section 2, a machine 4, i.e., the die-sinking machine as such, a node or node station 5, a data link section 6 and a power supply 7. Provided firstly the same as in the known arrangement of FIG. 2 as described at the outset is a main power input 1 followed by the electronics section 2 comprising a power supply module (AC), a DC module (DC) and a numerical control module (CNC). The electronics section or cabinet 2 comprises in this embodiment fewer elements, however, and can be accommodated e.g. in an operator console. The further elements such as a drive module (DRIVE), a generator module (GEN) and a universal machine control module (CONTROL) are arranged directly at or in the machine 4 where needed to satisfy their functions.

Provided in the data link section 6 of the system are standardized digital data links (LINK) all of which emanate from the central node 5 to form a star-type network. According to an embodiment these data links implement a kind of local area network (LAN) or data network via which the various modules of the system intercommunicate and via which they are enabled to communicate with each other and/or with the node 5. In this embodiment the node 5 is adapted to make information or resources available to the various modules of the system such as, for instance, a configurable generator module. Data transmission and swapping on standardized data links (LINK) is done for example via known network protocols. A network protocol regulates the data transport, addressing, routing, fault testing, etc. One suitable protocol is, for example, the Ethernet protocol as standardized on IEEE standard 802.3. Ethernet is a frame-based interlinking technology for local area networks (LAN) which determines the types of cables to be used, signalling for the bit transmission layer as well as packet formats and protocols for date communication. More details as to this will be made later in the description of the embodiments of FIGS. 17 and 18.

In addition to the cited star topology other network topologies are just as possible, such as for instance a bus or a ring network. Moreover, in some embodiments local networks can be used with static or dynamic channel allocation. Preferred are systems in which a channel can be allocated optionally and determined from the node 5.

In another embodiment the data for communicating via the data network is packetized and then sent via a data link (LINK) corresponding to the protocol in each case on the way to the node 5 and from there, where necessary, further to the intended receiving module of the system. In one example embodiment the node 5 stores this information, where necessary, and ensures that it arrives at the receiver. Among the many advantages of the network in accordance with this embodiment the fast data exchange between the various modules of the die-sinking machine system and particularly the possibility of making available data and information about the modules to an operator centrally at the node 5 are important. All information and commands to and from the various modules may be available in the node 5 also for diagnostic routines; in this embodiment the node acts as a network entity. The node station 5 may be sited for good access, but preferably on the machine 4. In addition, the node 5 and the data network connected thereto permits intervention and modifications by the machine operator at this central station with access of the interventions and modifications to all modules.

Figure 2:
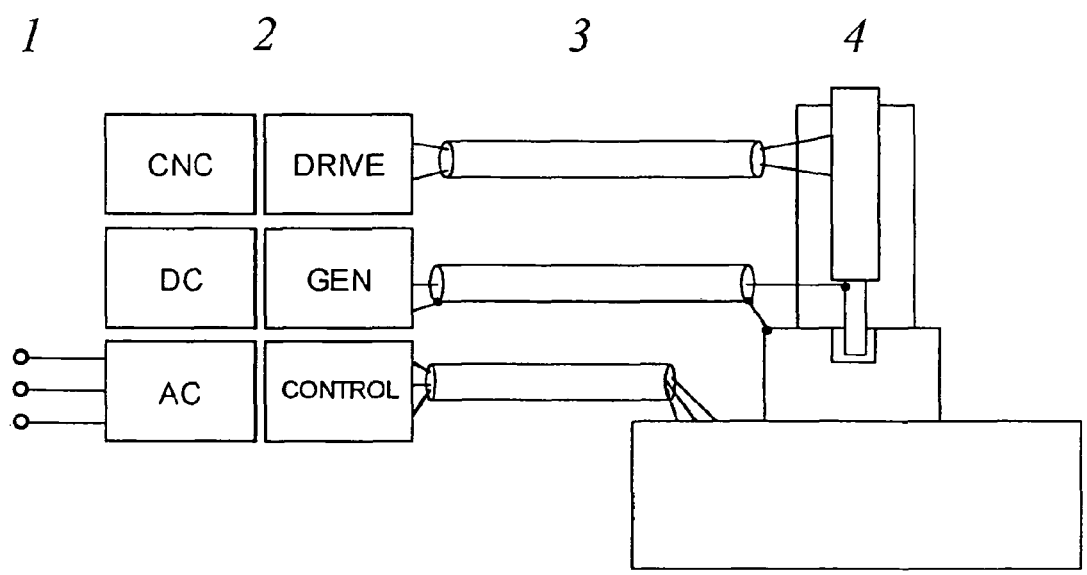
FIG. 2 is a schematic view of a prior art die-sinking EDM machine.
Figure 3:
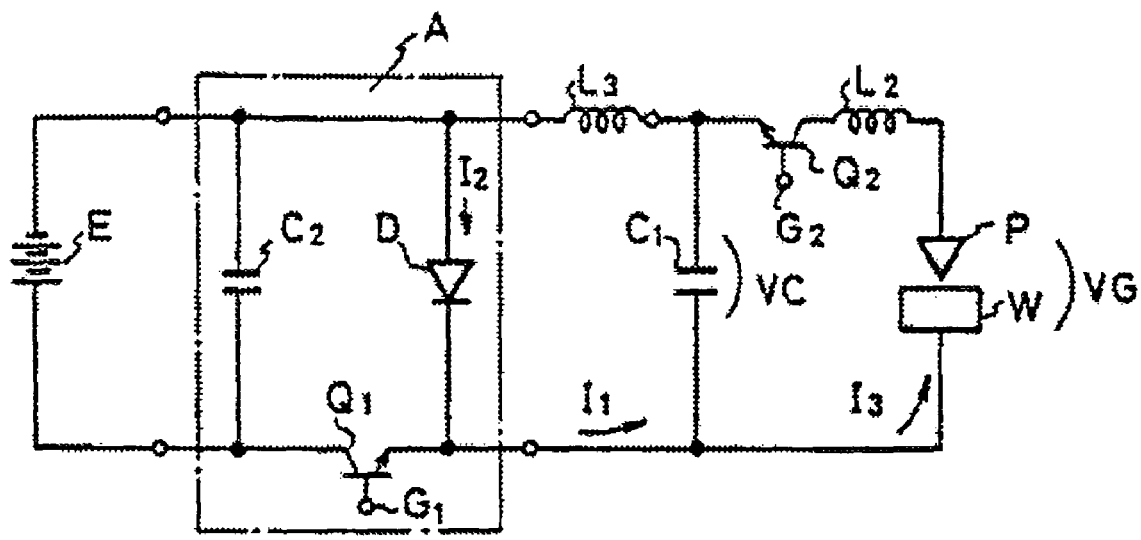
FIG. 3 is a schematic circuit diagram of a known generator in accordance with the pulse capacitor discharge principle.
Figure 4:
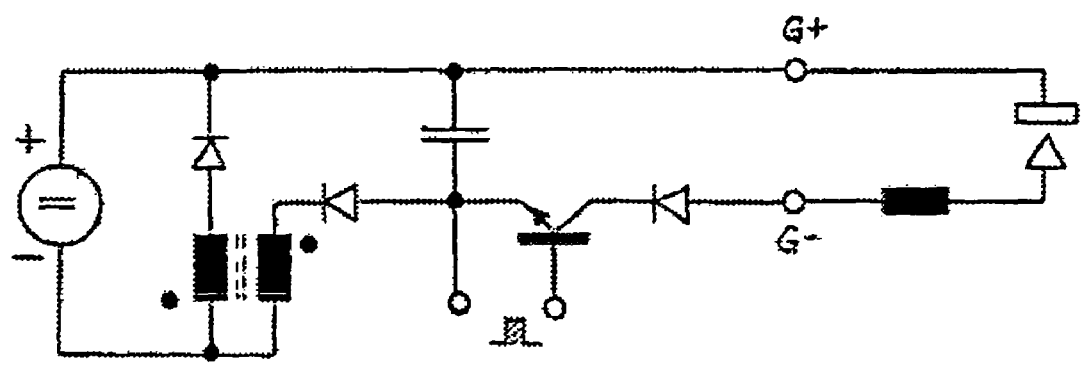
FIG. 4 is a schematic circuit diagram of a further known generator in accordance with the pulse capacitor discharge principle.

The power supply of the various modules of the EDM system is preferably made directly up to a maximum power of approximately 50 W via the digital network links (LINK) which then also serve the power supply. For higher power ratings standardized DC cables 7 are provided extending star-like from the DC module in the electronics section 2 to the modules having the higher power requirement. A DC cable having a wire cross section of just 1.5 mm$^2$ and a DC voltage of for example +/−280V is capable to transmitting up to 5.6 kW of which just 2.3 W/m is converted into heat. By comparison, current wire-cutting generators typically require an average of 2.2 kW spark power for cutting 500 mm$^2$/min e.g. in steel of which a good 37 W/m is dissipated as heat over the cable system 3, as used in prior art (see FIG. 2), when comprising eight parallel coaxial cables of 5 mm$^2$ wire cross section each. Under these circumstances the DC cable 7 transforms just an ignorable 0.37 W/m in heat, in other words 100 times less. Extrapolating current values to an average spark wattage of 5.6 kW would result in a material removal rate of 1250 mm$^2$/min in steel and a power loss of 94 W/m would be involved on the known cable system 3, as shown in FIG. 2. This consideration clearly shows the limits for a future development, i.e. current generators are obviously unsuitable for advancing into such ranges.

In another embodiment (not shown) the main power input 1, the AC module (AC) and the power supply or DC module (DC) are sited on the machine. As a result of this advantageous arrangement of the electronics section 2 and thus the operator console of the die-sinking machine now merely comprises the numerical control (CNC) and can thus be connected via a sole standardized digital link (LINK). In yet another example embodiment the numerical control (CNC) is supplied thereby with the necessary electrical energy in thus enabling existing standardized DC cables (DC) to be designed shorter and now sited only internally in the machine 4.

The modular configuration in accordance with the embodiments of the die-sinking EDM system considerably facilitates current installation of such a system, it now merely requiring connecting the main power input 1 to the power supply and, where necessary, plugging the digital links (LINK) into the operator console.

In yet another preferred embodiment the invention makes use of a bipolar charging principle in which the energy consumed in the pulse capacitor is now simply supplemented for a subsequent pulse without having to invert the polarity of the voltage at the pulse capacitor as is known.

Figure 5:
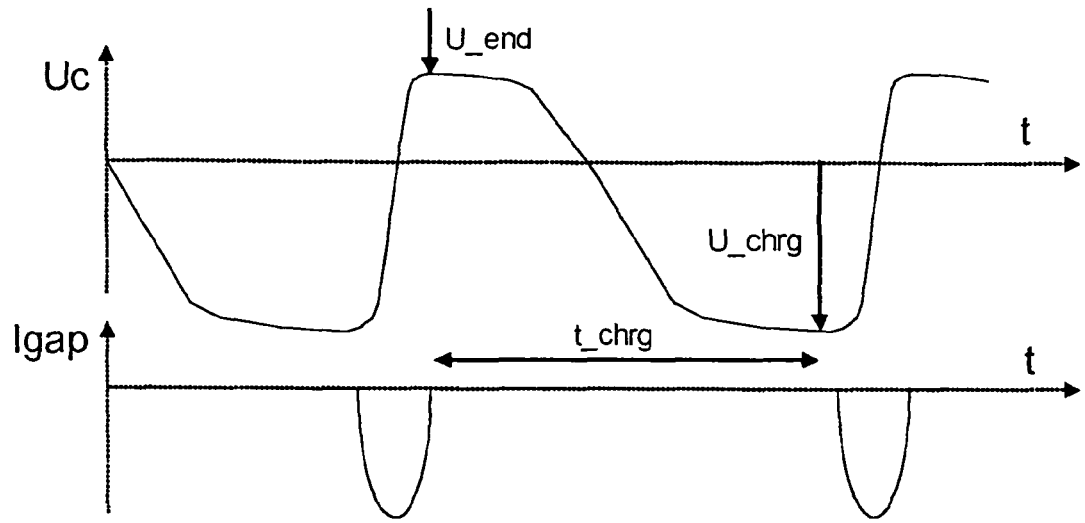
FIG. 5 are schematic timing diagrams showing the curve of the capacitor voltage and pulse current in accordance with the known pulse capacitor charge and discharge principle.
Figure 6:
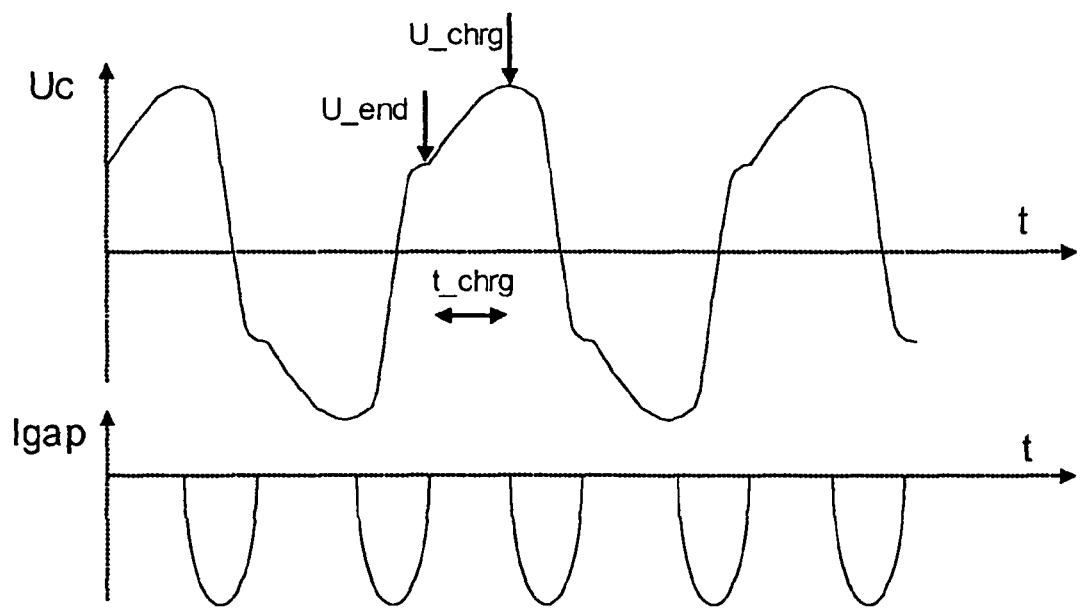
FIG. 6 are timing diagrams showing the curve of the charge voltage and discharge current in accordance with the pulse capacitor charge and discharge principle of an embodiment of the invention.

Referring now to FIG. 6 there are illustrated the waveforms of the capacitor voltage Uc and pulse current Igap with time for a generator of an embodiment as described in the following in comparison to the waveforms for a known generator as shown in FIG. 5. For a comparable charge current the charging time t_chrg of FIG. 6 is factors shorter than that as plotted in FIG. 5, and the residual charging voltage U_end is supplemented merely by a short current pulse of correct polarity to the desired charging voltage U_chrg. The residual charging voltage U_end experiences no transformation via magnetic energy, this being the reason why it is conserved with near 100% efficiency, enabling the maximum frequency of the discharge pulses to be significantly increased.

Figure 7:
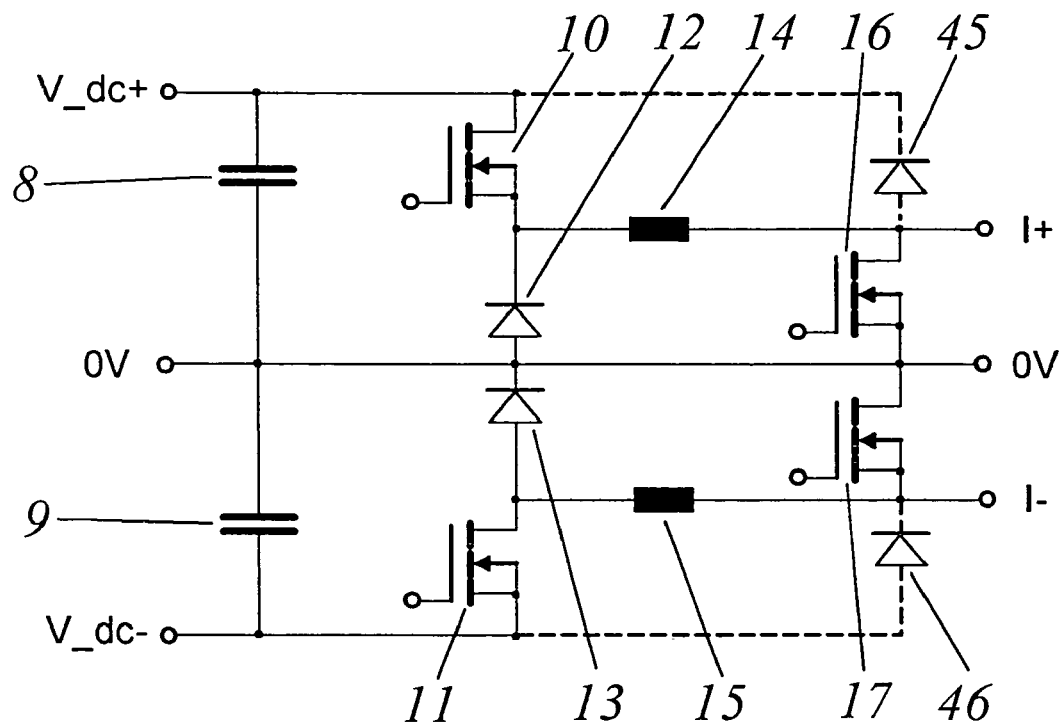
FIG. 7 is a schematic circuit diagram of a bipolar current source in accordance with an embodiment of the invention.

Referring now to FIG. 7 there is illustrated a charge regulator in the form of a bipolar current source of an embodiment of the invention. The inputs V_dc+, V_dc− and the neutral 0V are supplied with a DC voltage of, for example, +/−280V from a DC voltage module via a standardized DC voltage cable 7 (see FIG. 1). The neutral 0V roughly corresponds to ground potential with symmetrical loading which is of advantage for a high electromagnetic compatibility (EMC) of the system.

In the simplest case the DC voltage is directly obtained from the DC module (DC) via a three-phase rectifier bridge and filter capacitors from the popular 400V AC mains and requires no line isolation as such.

As an alternative a three-phase active inverter bridge comprising electronic switching elements and diodes can be provided. This alternative permits achieving a wealth of additional functions such as closed loop DC control for compensating AC mains fluctuations, increasing the DC voltage above the peak AC mains, a soft start function, power factor correction (PFC), neutral 0V stabilization on asymmetrical DC loading, and DC to 400V AC mains energy return. All of these circuits are known to the person skilled in the art and require no further comments herein.

The capacitors 8 and 9 furnish the current pulses for the bipolar current source 10 to 17, they being provided to maintain the DC voltage cable 7 (DC) free from pulsating currents. A positive current source serves to generate a positive charging current I+. The switching elements 10 and 16 are simultaneously turned on, resulting in a linear increasing current, starting from the input V_dc+ via the inductance 14 back to the 0V terminal. After a certain time, and not before the output I+ has been switched to the pulse capacitor 22 for charging (FIG. 8) the switching element 16 and, where necessary, the switching element 10 are turned off. As of this point in time the charge current I+ flows into the pulse capacitor 22 in supplementing its charge voltage. A sensor (SENS in FIG. 8) compares the charge voltage to a set value and sends a data signal to the controller (FPGA in FIG. 10) as soon as the charge voltage has attained the set value. The switching element 16 is then turned on, resulting in a sudden collapse of the charge current I+ in the pulse capacitor. If the switching element 10 was still turned on at this point in time, it is likewise turned off and the remaining residual current I+ then circulated via the diode 12, inductance 14 and the switching element 16. For furnishing a subsequent charging pulse current of the same polarity, the switching element 10 is again turned on at the suitably point in time and the procedure as described above repeated.

Since the inductance 14 acts as a current source, the charge voltage at the pulse capacitor 22 may be considerably higher than the voltage at the output V_dc+. This could, however, have fatal consequences for the switching element 16 if this namely were to be opened live because of a malfunction before the charge current output I+ is connected to the pulse capacitor 22. This is why either transient protection diodes (not shown) are provided in parallel with the switching elements 16 and 17 or the recuperation diodes 45 and 46 can be additionally inserted between the terminals I+ and V_dc+ and I− and V_dc− respectively to restrict the charge voltage to the input voltages V_dc+ and V_dc−. If necessary, the input voltages V_dc+ and I− and V_dc− can be increased. To generate discharge pulses of high amplitude and low duration, it is best to work with as high a charge voltage as possible in conjunction with a minimum capacitance of the pulse capacitor 22.

The mirror inverted configuration consisting of the switching elements 11 and 17, the diodes 13 and the inductance 15 serves to generate the negative charge current I− and functions in an analogous manner to the positive current source as described above.

The bipolar current source as shown in FIG. 7 can be operated highly diversely. When attempting minimum losses whilst maximizing the operating frequency differing approaches may be needed in part depending on the particular application concerned.

Thus, it is important for good efficiency to prohibit the circulation of unnecessarily high currents in the inductances 14, 15 and diodes 12, 13 over a lengthy period of time. One alternative which prevents this is useful where the additional recuperation diodes 45, 46 are employed, by turning off the switching elements 10 and 16 or 11 and 17 on completion of having charged the pulse capacitor 22. The magnetic residual energy stored in the inductances 14 or 15 is then retrieved via the diodes 12 and 45 or 13 and 46 into the capacitors 8 and 9. This mode of operation is of advantage when a minimum pause between two charge pulses exists, otherwise it is more of an advantage to make use of the residual energy directly for the next charge pulse.

Another alternative embodiment materializes for timing the turnoff of the switching elements 16, 17 on commencement of capacitor charging. Selecting namely this point in time already during the discharge pulse, ideally when the crossover of the pulse capacitor 22 is just 0V voltage, achieves an absolutely lossless commutation.

As a positive side-effect the charging time is also shortened by this arrangement. Indeed, thanks to this method, in an extreme situation, the pulse capacitor 22 may have already reattained the set value of the charge voltage at the end of its discharge, in thus being directly available for a subsequent discharge.

To maximize the operating frequency the values for the inductances 14, 15 are minimized and the charging action of these inductances 14, 15 is initiated directly on commencement of discharge of the pulse capacitor 22. For higher charge voltages it is further of advantage to leave the switching elements 10, 11 turned on also during capacitor charging, the charging action being further shortened due to the additional energy from the capacitors 8, 9.

Figure 8:
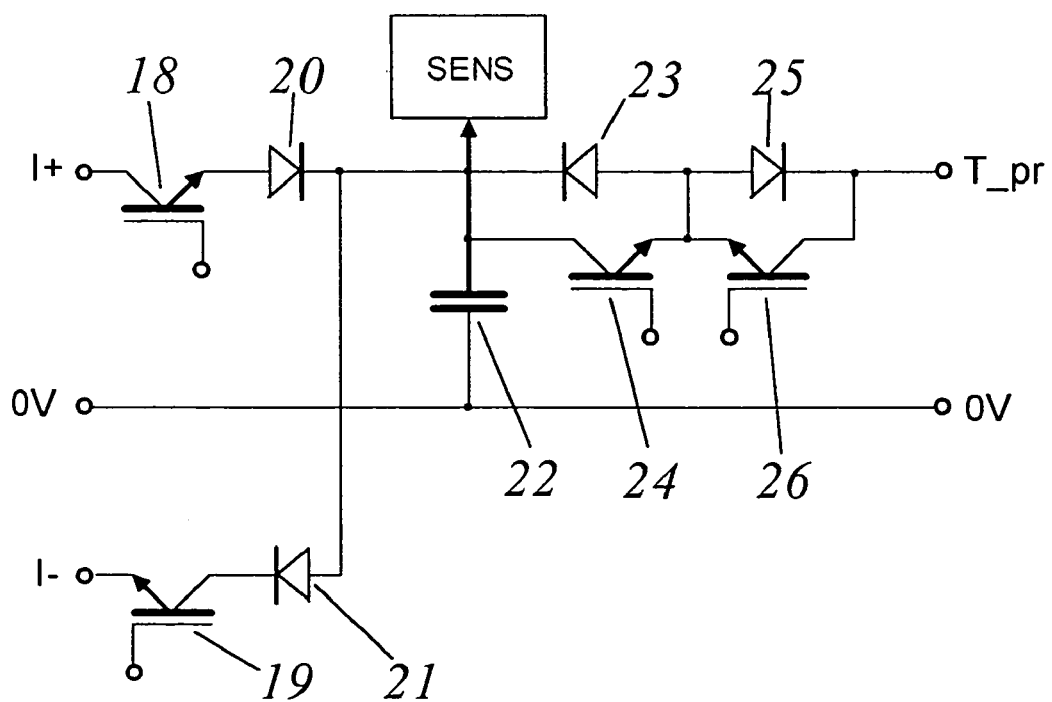
FIG. 8 is a schematic circuit diagram of a charge and discharge circuit for the pulse capacitor in accordance with an embodiment of the invention.

The charge and discharge circuit of an embodiment as shown in FIG. 8 for the pulse capacitor 22 is connected via corresponding inputs I+, I− to the bipolar current source as shown in FIG. 7. The second terminal is connected to the 0V input which in turn is connected to the neutral 0V of the bipolar current source. The switching elements 18, 19 together with the diodes 20, 21 are responsible for applying the desired polarity during charging. At the pulse capacitor 22 a sensor (SENS) continually senses the charge condition and derives therefrom various data signals. The switching elements 24 and 26 with the diodes 23 and 25 serve to discharge the pulse capacitor 22 with the correct polarity to the output T_pr.

Figure 9:
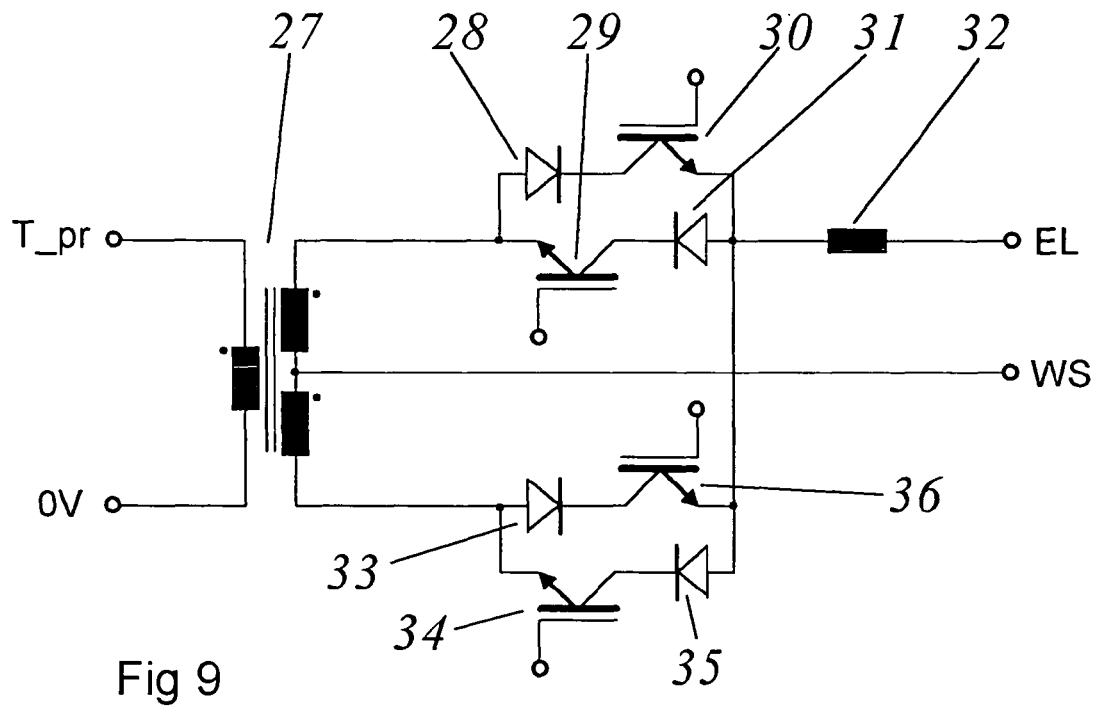
FIG. 9 is a schematic circuit diagram of an inverter circuit including an isolating transformer in accordance with an embodiment of the invention.

The primary input T_pr of an isolating transformer 27 of the inverter circuit as shown in FIG. 9 is connected to the corresponding output T_pr of the charge and discharge circuit as shown in FIG. 8. The second primary input 0V of the isolating transformer 27 is connected to the corresponding neutral 0V as shown in FIG. 7. The isolating transformer 27 comprises two secondary windings connected in series so as to always make the positive and negative pulse polarity available. The neutral of these secondary windings is connected to the output WS which in turn is connected to the workpiece.

Configuring the generator circuit strictly symmetrical about the neutral 0V is of advantage for electromagnetic compatibility. Since the workpiece is normally at ground potential no, or only insignificant, capacitive displacement currents materialize through the circuit to the AC mains connection 1. The advantage is a reduction in costs, losses and footprint for large magnetic suppression elements.

The two other terminals of these secondary windings of the isolating transformer 27 are connected to the output EL via switching elements 29, 30, 34 and 36 as well as their assigned diodes 28, 31, 33 and 35 and via an inductance 32. The output EL is in turn connected to the electrode. The switching elements 30 and 36 in this arrangement are turned on for positive discharge pulses whilst the switching elements 34 and 29 are used correspondingly for the negative discharge pulses. This enables any momentary polarity of the charge voltage of the pulse capacitor 22 to be converted into an arbitrary polarity for the discharge pulse into the spark gap.

The inverter circuit can, however, also be simplified when, e.g. for a die-sinking machine, only positive discharge pulses are needed from the generator module by eliminating is the switching elements 29, 34 and their diodes 31, 35. The same applies for a wire cutting machine from which the switching elements 30, 36 and their diodes 28, 33 can be eliminated when requiring only negative pulses.

In this embodiment the isolating transformer 27 offers likewise multiple dimensioning degrees of freedom. Advantageously, one ensures an adequate surge voltage withstanding capacity for isolating the AC mains in keeping with standard requirements. Furthermore, one idealizes the coupling between the primary side and secondary side and maintains the main inductance sufficiently high so that no excessively high magnetization currents occur. Both measures advantageously prevent losses of the pulse current.

For an optimum coupling a winding ratio of 1:1 is ideal, although deviating from this requirement may be of advantage for the overall efficiency to operate e.g. the charge and discharge circuit as shown in FIG. 8 with less current and correspondingly more voltage as may be quite right since corresponding components having a high surge voltage withstanding capacity are available and, as explained further on, no commutation losses have to be dealt with. Reducing the current diminishes the forward losses of all switching elements and diodes in thus enhancing the overall efficiency.

According to an embodiment the cited requirements on the isolating transformer 27 are satisfied with planar transformers having planar cores and planar windings. Such transformers with special regard to standard isolation performance are disclosed, for example, in U.S. Pat. No. 5,010,314 and produced by the firm of PAYTON PLANAR MAGNETICS Ltd. Boca Raton, South Fla. USA. Since the voltage/time area of the pulses being transmitted is very small, these transformers are so small and light that they can be integrated in the printed circuit of a generator module with no problem. This technology also lends itself to advantage for the inductances 14, 15 and 32.

According to embodiments the inductance 32 can be selected smaller, or even eliminated altogether as long as a residual conductor to the electrode and the stray inductance of the isolating transformer already comprises adequate inductance. The inductance is necessary for channel separation when multiple generator channels overlap in pulsing an electrode.

In the embodiments of FIGS. 7, 8 and 9 MOSFETs and IGBTs are cited as the switching elements 10 to 36. This is not a mandatory choice and can be altered by the person skilled in the art in accordance with the specific requirements.

For the arrangement of the switching elements and diodes of the inverter as shown in FIG. 9 there are likewise alternatives. Thus, for instance, switching element 29 with switching element 30 in the opposite direction can be connected in series, with the diodes 28 and 31 parallel thereto in the corresponding opposite direction. Here too, it is up to the person skilled in the art to apply the variant as most favorable overall for the requirement in each case.

The switching elements 18 to 36 are subject only to forward losses, i.e. they are each activated with zero current because each sinusoidal half-wave commences with zero current and thus the product of voltage and current (in other words the power loss during commutation) is likewise zero. For turning off, the situation is even more favorable, since for this point in time both the current and the voltage amount to zero, because the voltage is blocked by a corresponding series diode.

The pulses needed to control all switching elements are furnished by a controller (FGPA in FIG. 10) via DC decoupled driver circuits (not shown).

As evident from FIG. 6 a bipolar current source needing simply to charge a single pulse capacitor would be undertaxed because of the short charging time t_chrg.

Figure 10:
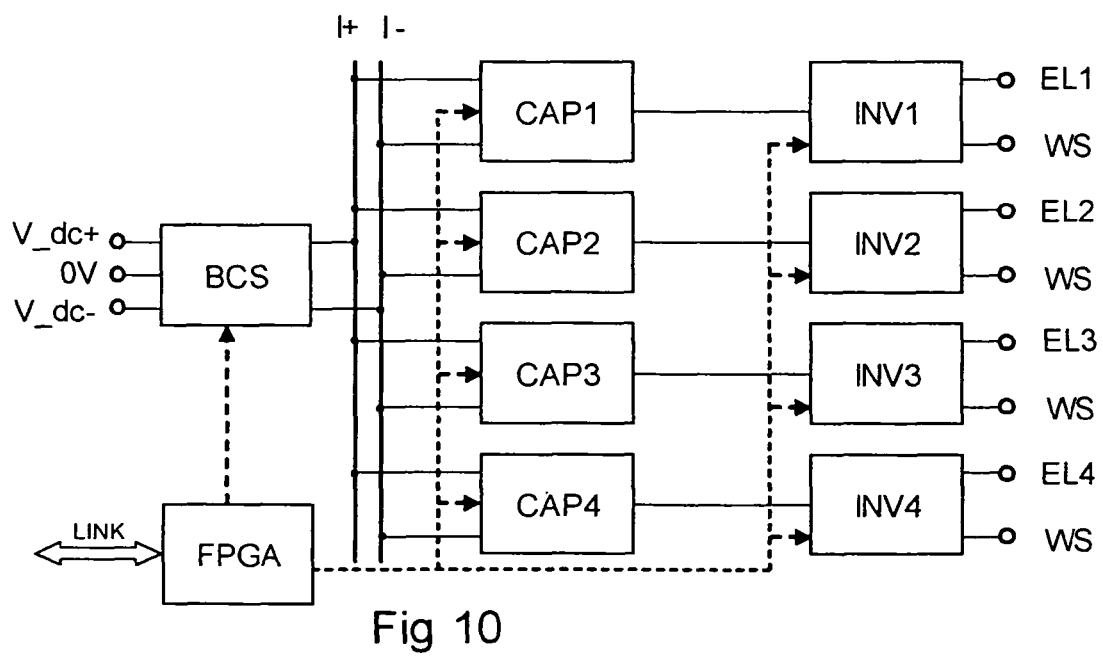
FIG. 10 is a schematic circuit diagram of a generator module including a plurality of charge and discharge circuits and a plurality of inverter circuits in accordance with an embodiment of the invention.

Referring now to FIG. 10 there is illustrated an embodiment for a generator module (GEN) in a multi-channel configuration. This generator module consists of just one bipolar current source (BCS as shown in FIG. 7) with the inputs V_dc+, 0V and V_dc− as well as a controller (FPGA) connected by a digital link (LINK) to the node 5 (see FIG. 1). The controller (FPGA) is preferably a field-programmable gate array, i.e. a digital configurable logic circuit which can also be configured over the data network 6 (see FIG. 1) of the system and supplied with variable settings, it even being possible to load a new configuration during system operation. This is why these circuits achieve maximum functional flexibility and thanks to parallel data processing are significantly faster than even the fastest available microprocessors. However, should sequential data processing be needed, there is no problem in implementing this too in the FPGA, i.e. without negatively influencing the speed of parallel processing.

Connected to the bipolar current source (BCS) are multiple charge and discharge circuits (CAP1 to CAP4), as shown in FIG. 8, for pulse capacitors 22 via the conductors I+ and I−. Each charge and discharge circuit (CAP1 to CAP4) is connected to an inverter circuit (INV1 to INV4) as shown in FIG. 9. The inverter circuits (INV1 to INV4) have separate outputs to the workpiece (WS) as well as separate outputs EL1 to EL4 which can be connected to four single electrodes or in common to just one electrode.

Referring now to FIG. 10 there is illustrated how the controller (FPGA) features dotted links to all switching is elements and sensors of the various circuit parts of the generator module, such as driver circuits for driving the switching elements, but which also monitor the switching elements and make connections to the sensors (SENS as shown in FIG. 8). Due to the central function of the controller (FPGA) an ideal coordination and monitoring of the complete generator module is possible with no time delay nuisance. All conditions, malfunctions and sensed values are signaled via the data link (LINK) to the node 5 as they occur, cyclically or on request.

According to an embodiment, such a generator module can now be produced automatically with the unwired SMD components as mentioned at the outset and with one of a SMT production method.

Since these modules are adapted to be installed everywhere in the machine they must not emit heat to their surroundings. Since normal air cooling could be insufficient for this purpose, according to an embodiment preference is given to a fluid cooling system to carry off the waste heat.

According to another embodiment, the modules of the EDM system can also be protected from harsh environmental effects in the machine such as dirt, splash water and electromagnetic interference by a dense housing of metallized plastics or, even better, of metal to meet these requirements.

Figure 11:
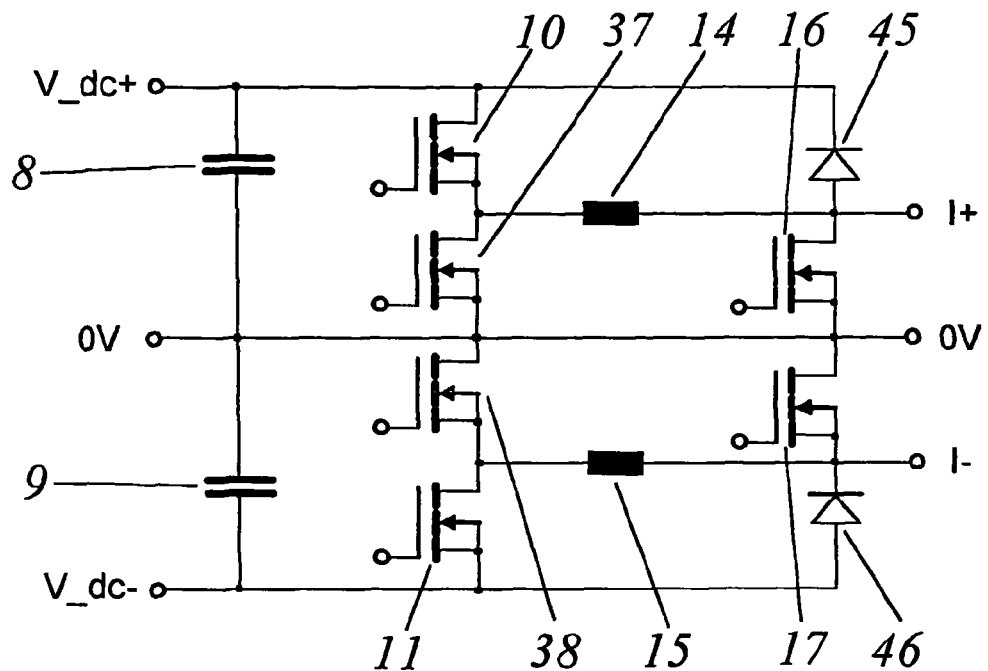
FIG. 11 shows a schematic circuit diagram of an embodiment of a bipolar current source in accordance with the invention suitable for energy recovery.

Referring now to FIG. 11 there is illustrated an alternative embodiment of the bipolar current source as shown in FIG. 7 which is suitable for energy recovery. Energy recovery is of advantage when after a discharge the pulse capacitor 22 features a voltage higher than required by the setpoint value for the charging voltage. One popular, albeit unfavorable, alternative would be to convert this excess energy into heat. Typical instances of this are: when an electrical discharge machining pulse is quenched in the end by a counter pulse or when a motor with its moved masses needs to be braked. In this first instance the capacitors 8, 9 or even just the inductances 14, 15 are sufficient for buffering the energy.

In the second instance the energy total may be significantly higher, the normal solution to which are so-called brake resistors. The energy converted into heat in the brake resistor is extremely undesirable where miniaturized modules are concerned and can also seriously reduce the overall efficiency under certain operating conditions (e.g. frequent, fast braking a machine tool high-frequency spindle, or frequent, fast flushing movements of an electrical discharge machining servo-axis). This is why this embodiment provides for energy recovery into the 400 V three-phase mains.

The equation as it reads from the aforementioned "Proceedings of the 13$^{th}$ ISEM", Vol. 1, Bilbao 2001, pages 3 to 19, MASUZAWA, for the recuperation case is now amended as follows:

$$U_{\_end} = -U_{\_chrg} - 2 * U_{\_gap} * \left(2 * \frac{t_R}{T} - 1\right)$$

where $t_R$ (recuperation time) represents the time duration during which an inverted part-pulse acts contrary to the spark voltage U_gap or a motor voltage.

T defines the duration of the inverted part-pulse. When $t_R=0$ we again have the known MASUZAWA equation. When $t_R=0.5$ T in all no energy is given off to the spark gap:

$$U_{\_end} = -U_{\_chrg}$$

And when $t_R=T$ the maximum energy from the spark gap is reflected back into the pulse capacitor 22:

$$U_{\_end} = -U_{\_chrg} - 2 * U_{\_gap}$$

In these three extreme points the expanded equation is precise. For other intermediate values of $t_R$ their validity could still be demonstrated by a general differential equation. But for dimensioning the circuit these three extreme values are fully sufficient.

Figure 12:
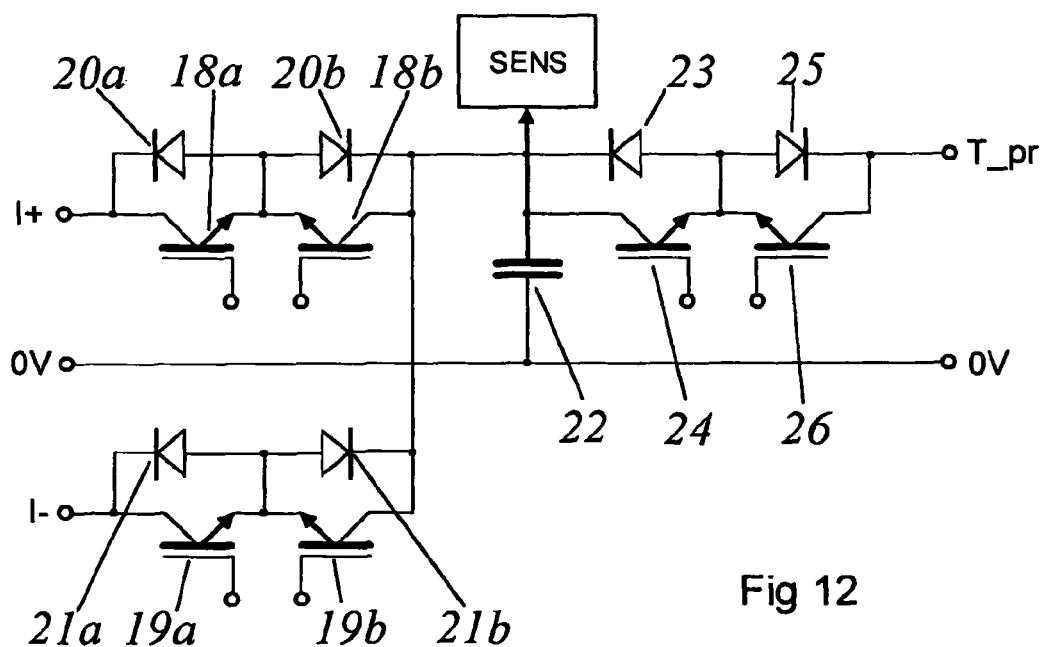
FIG. 12 shows a schematic circuit diagram of an embodiment of a charge and discharge circuit in accordance with the invention for the pulse capacitor suitable for energy recovery.

Referring now to FIG. 11 there is illustrated how the diodes 45 and 46 are provided whilst the diodes 12 and 13 are replaced by MOSFET switching elements 37 and 38, respectively. To, for instance, reduce a positive charging voltage of the pulse capacitor 22 to a setpoint value, the switching elements 37 and 18b as shown in FIG. 12 are turned on until the setpoint value is attained. Subsequently, both switching elements are turned off, the current then flowing from the 0V conductor via the parasitic diode of the MOSFET 16, the inductance 14 and parasitic diode of the MOSFET 10 into the V_dc+ terminal.

According to an embodiment also during this phase, for smaller voltages V_dc+, one could (after a safety pause) turn on the switching elements 10 and 16 (synchronous rectification) resulting in smaller forward losses in improving the efficiency somewhat. This turn on is not worthwhile for higher voltages V_dc+ exceeding for instance 200V, i.e. less than 1% improvement in efficiency, since the gain can be canceled out by the additional losses of the driver circuits.

The voltage V_dc+ is increased by the recuperation current by first the capacitor 8 being charged to a higher voltage. This voltage may then be imaged via the cable system 7 (FIG. 1) on all capacitors 8 of the further modules, but also on the large electrolytic capacitors in the DC module (DC, FIG. 1) so that the energy gain is available to all connected modules. This results in e.g. a favorable compensating effect in die-sinking EDM with fast flushing movements in ultimately making the braking energy of the drive module directly available to the benefit of the generator module at the end of the flushing cycle for recommencing electrical discharge machining.

An increase in the braking energy could drive the voltage V_dc+ hazardously high. This is why this energy needs to be either converted into heat in a load resistor (braking resistor) or, much better, fed back via the three-phase inverter bridge as mentioned with respect to FIG. 7 into the 400V main power supply.

In this embodiment, it is thus evident that energy can be recovered in three stages: firstly within a module via the capacitors 8, 9, secondly: via the electrolytic capacitors of the DC module (DC), or thirdly: full returned into the main power supply. The flow of energy in each case is accordingly only within a module, between various modules or even between various mains consumers.

Referring now to FIG. 12 there are illustrated the modified embodiments proposed for the charge and discharge circuit to permit energy recovery. Now, instead of the diodes 20, 21 four diodes 20a, 20b, 21a, 21b are provided, the same applying to the switching elements 18 and 19 as replaced by the switching elements 18a, 18b, 19a, 19b. This is necessary so that the pulse capacitor 22 can be charged and discharged in both current directions I+, I−. It is evident that although the circuits as shown in FIGS. 11 and 12 are complicated, the advantageous features of the basic circuits as shown in FIGS. 7 and 8 are maintained, indeed are even improved for the efficiency in energy storage in the inductances 14, 15 is considerably improved e.g. by the switching elements 37, 38 instead of the diodes 12, 13.

Figure 13:
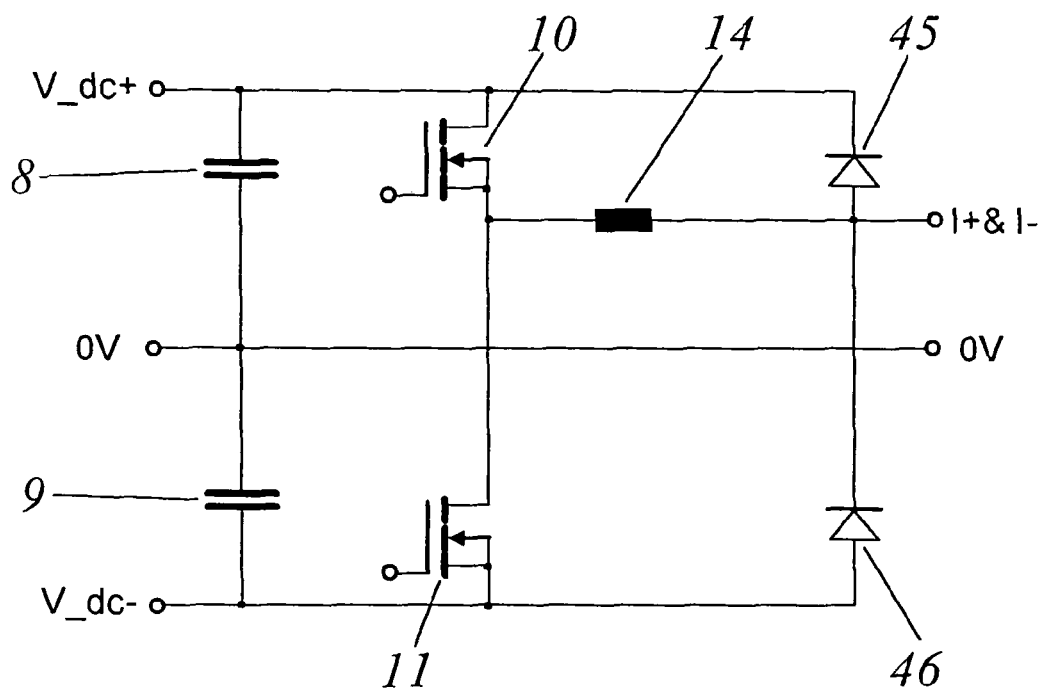
FIG. 13 shows a schematic circuit diagram of a further embodiment of a bipolar current source in accordance with the invention suitable for energy recovery.
Figure 14:
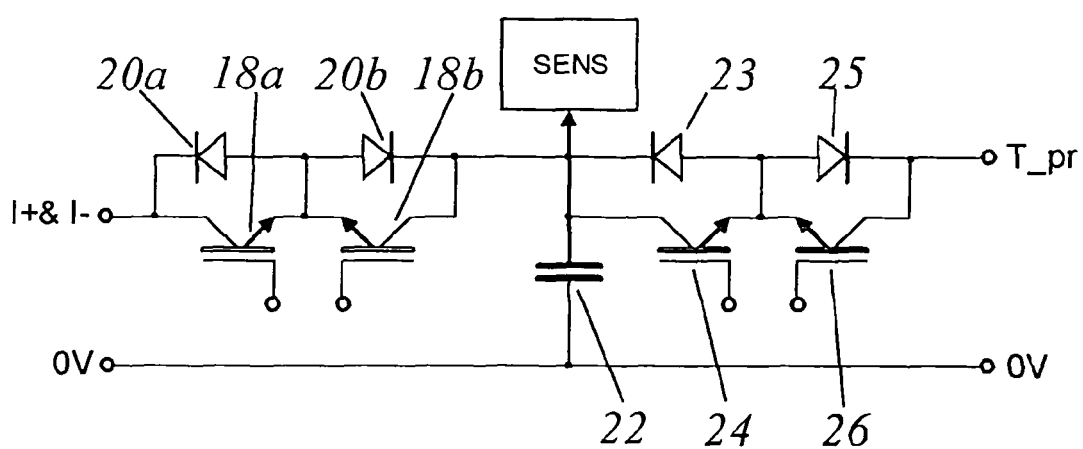
FIG. 14 shows a schematic circuit diagram of an embodiment of a charge and discharge circuit in accordance with the invention for the pulse capacitor suitable for energy recovery.

Referring now to FIGS. 13 and 14 there is illustrated another embodiment for a simplified solution. The bipolar current source in FIG. 13 works in this case only into one bipolar output I+ & I−, and thus in FIG. 14 only two switching elements 18a, 18b and only two diodes 20a, 20b are needed in addition to charge and discharge the pulse capacitor 22 in both current directions. Further intermediate steps are possible in simplifying the situation, for instance, one could retain the switching elements 16 and 17 and employ then in parallel with the diodes 45, 46 or instead of diodes 45, 46. The choice of the most favorable configuration can be left to the person skilled in the art.

The advantage of this embodiment is the reduction in costs and size by six switching elements 37, 38, 16, 17, 19a, 19b, two diodes 21a, 21b and an inductance 15 being eliminated.

That the switching elements 10, 11 now need to work over twice the voltage range V_dc+ to V_dc− and that the inductance 14 is AC loaded also in normal operation (without energy recovery) are disadvantages which can be accepted. Both result in disadvantages as regards the costs, size or efficiency but which are more than made up for by the advantages as mentioned, depending on the particular application. For maximum operating frequencies this variant is less suitable, because the inductance 14 can now be charged in advance, unless, as mentioned, the switching elements 16, 17 are retained.

In FIGS. 7 to 9 and FIGS. 11 to 14 MOSFETs and IGBTs are cited as the switching elements 10 to 38. This is not a mandatory choice and can be altered by the person skilled in the art in accordance with the specific requirements.

For the arrangement of the switching elements and diodes of the inverter as shown in FIG. 9 there are likewise alternatives. Thus, for instance, switching element 29 with switching element 30 in the opposite direction can be connected in series, with the diodes 28 and 31 parallel thereto in the corresponding opposite direction. Here too, it is up to the person skilled in the art to apply the variant as most favorable overall for the requirement in each case.

Figure 15:
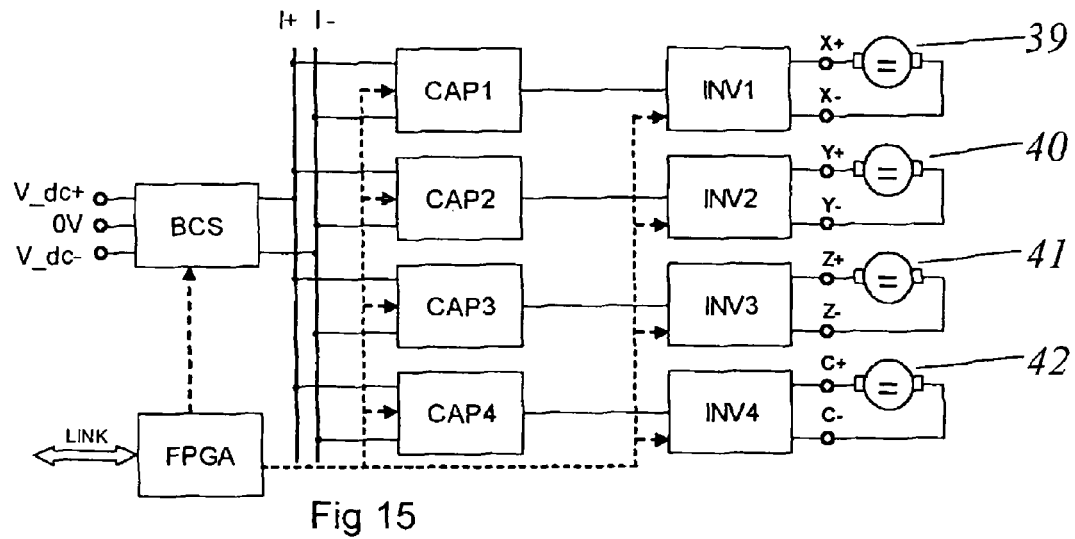
FIG. 15 shows a schematic view of an embodiment of an application in accordance with the invention of the generator module for four DC servomotors.

Referring now to FIG. 15 there is illustrated an alternative embodiment of the generator module as shown in FIG. 10 as a power module for four DC servomotors 39, 40, 41, 42 of a machine tool. Since any pulse shape of any polarity (and thus also DC) can be generated at the outputs X+, Y+, Z+, C+ and information is made available via the sensors (SENS) quickly, the generator module is also suitable for highly dynamic drives. The motors can also be short-circuited via the inverter circuit as shown in FIG. 9 in any polarity via the switching elements 29, 34 or 30, 36 without repercussions for the charge and discharge circuit. Depending on the type of motors concerned, it may be necessary to insert filter capacitors (not shown) in parallel with the motor windings.

The signals of any position sensors provided can be directly supplied to the controller (FPGA). It may prove to be of advantage to design the module only for one motor in forming an assembly therewith to thus eliminate a complicated cable system as a further advantage the fluid cooling of the module can also be used directly for cooling the motor. For smaller drives totalling less than approximately 50 W the power supply can be made directly via the digital link in eliminating the DC terminal (V_dc+, V_dc−).

Figure 16:
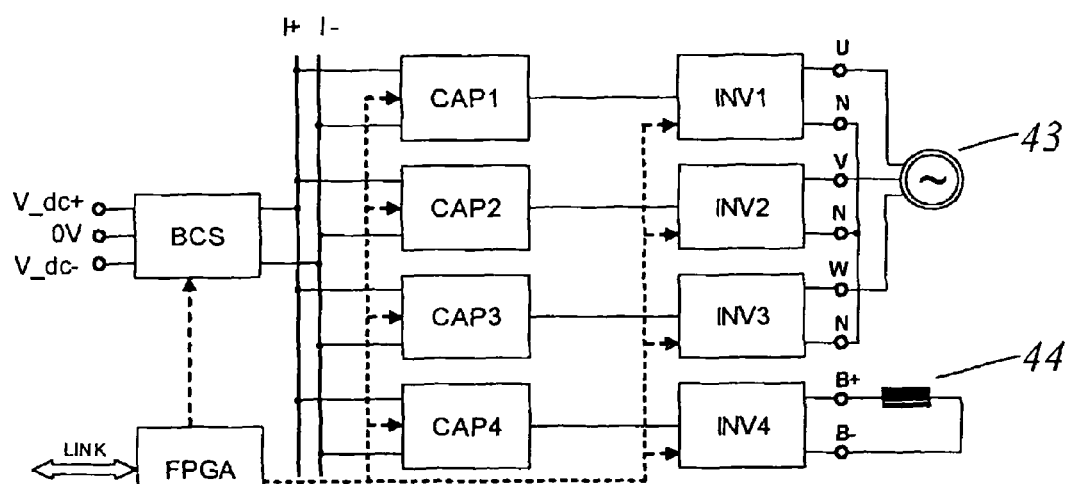
FIG. 16 shows a schematic view of an embodiment of an application in accordance with the invention of the generator module for a three-phase motor and an electromagnetic brake.

Referring now to FIG. 16 there is illustrated another embodiment of a generator module as shown in FIG. 10 as a power module for an AC motor 43 and an electromagnetic brake 44 in which three channels U, V, W and N form a three-phase system of optional frequency and voltage. The AC motor 43 may be an induction or synchronous motor. The waveform of the motor currents in this arrangement may be sinusoidal or trapezoidal, it being synthesized corresponding from sinusoidal halfwaves of higher frequencies.

The applications of the embodiments as cited above extend from axis drives with brushless synchronous motors through high frequency spindles for machining and the like, up to pump drives with plain mains frequency induction motors. The preferred application is to be appreciated in the high dynamic range and high speed range in thus enabling e.g. pumps too, for instance, operated at high speeds, to be built much smaller and lighter.

Figure 17:
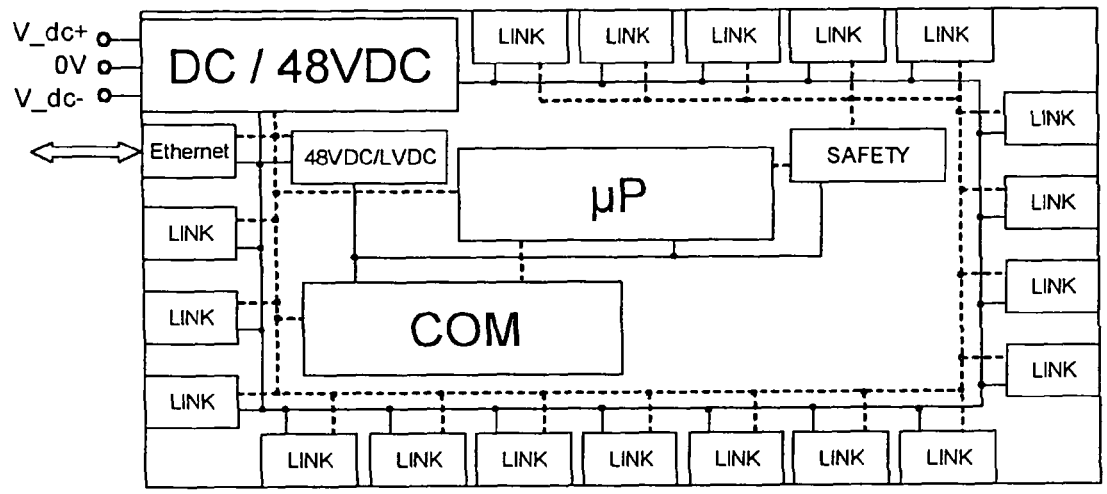
FIG. 17 shows a schematic view of an embodiment of a node in accordance with the invention including a stand-alone fine interpolator.

Referring now to FIG. 17 there is illustrated an embodiment of the node 5, as used in the EDM system as shown in FIG. 1, which is for example adapted for communication with an external numerical control (CNC). The node 5 forms in this embodiment also a network monitoring and managing entity for connecting the various modules of the die-sinking EDM system which are linked in the form of a local area network (LAN). Thus, in this example embodiment the node 5 may combine, as required, the functions of a usual hub, a smart hub, a switch or a router and those of a network managing entity, i.e., depending on the application and module. In other embodiments, however, the node 5 may simply act as a hub, a smart hub, a switch or a router of the data network of the EDM system.

In the shown embodiment the network of the die-sinking system is configured star-like. Further, all communication, control, diagnostic and safety functions of at least one of the modules are concentrated in the central node 5. The node 5 receives, for example, a data packet containing control or diagnostic information from one of the modules of the system at one of the multiple ports, which is then processed in the node 5, where necessary, and then sent over another port to the module requiring the information. For communicating with the other modules of the system the node 5, as shown in FIG. 17, features a plurality of ports corresponding to the communication standard as used in each case. In FIG. 17 the ports are designated "Ethernet" and "LINK". In this embodiment the LINK ports form the interfaces to the connected modules of the system. In accordance with this embodiment a dedicated Ethernet port is provided to communicate with the numerical control (CNC) in the electronics section 2, e.g., in accordance with the IEEE 802.3 standard of an ethernet network. It is to be noted, however, that the communication bandwidth of this link is also suitable to control the complete system, particularly also the spindle drives of the EDM system.

In accordance with another embodiment, a communication unit is provided at the node 5 in the form of an integrated circuit of the type ENC28J60 from MICROCHIP TECHNOLOGY INC. which satisfies the IEEE 802.3 standard, and is capable of communicating with a data rate of 10 Mb/s. This integrated circuit has the advantage that it is easy to combine with a microprocessor or a digitally configurable logic circuit.

The LINK ports of the node 5 are provided for bidirectional standardized data links (LINK) to the various modules of the system, an adequate number of which are preferably provided to permit future extensions or options. The standard of the data links is based e.g. on the IEEE 802.3af (Power over Ethernet) standardized so that via these links also a restricted power (smaller than approximately 50 W) can be transmitted for powering the power supply of the connected modules, if required. This power is sufficient for powering e.g. the controllers (FPGA), the driver circuits for the switching elements as well as the sensors and other smaller loads with the advantage that a diagnostic routine can be run on the complete system when idle. Thus, even when some channels are down, the remaining communication channels remain intact.

In accordance with an embodiment, the LINK ports are powered by, for example, a DC/48VDC power supply arranged in the node 5. A plug & play type detection circuit is provided in the node 5 to automatically detect the presence of a module and then to power up as defined as well as to handle any trouble such as brown-outs or short circuits.

In yet another embodiment each module of the EDM system is adapted to be configurable as regards to its and status and functions and comprises a programmable controller (FPGA).

Configuring or modifying the status of the is done as follows: the controller (FPGA) of the module preferably comprises a fixed, e.g. fixedly-stored, range and a variable range for carrying the configuration of the module and its functions. Based one the fixed storage instructions the module is able to establish a first bidirectional communication link with the node 5. After the module has been powered up it can be variably configured wherein the module first sends an identification message to the node 5 over the data network 6. This identification message may contain all information such as properties of the configuration, desired function, operating data, version and manufacturing data, so as to select the correct configuration for sending to the module. As an alternative, modules can, of course, be programmed with a fixed configuration over the full range at the cost, however, of their flexibility.

In yet another embodiment, each LINK port of the node 5 is adapted to be configurable and switchable. Preferably, the specific functions of the configurable ports are allocated to a specific one of the LINK ports after the connected module has been identified. This method working like that of plug & play has the advantage that faulty links are excluded at the node by the operator. Thanks to this method any defective port can be side-stepped by the simply re-plugging a spare port to permit continued operation of the machine until its next repair schedule.

In FIG. 17, the DC/48VDC power supply of the node 5 is connected at the primary end via the terminals V_dc+. 0V, V_dc− to the DC module (DC in FIG. 1). For the internal power supply of the node 5 of e.g. 3.3VDC, 2.5VDC and 1.8VDC voltage regulators (48VDC/LVDC) are provided. In this embodiment, a programmable logic circuit (COM) coordinates the data transmission and communication between the numerical control (CNC) and all other modules of the EDM system. The logic circuit (COM) is connected to all components of the node 5 by a bus line depicted dotted. The logic circuit (COM) is adapted to make fast decisions regarding communication between the modules and it organizes and coordinates the control sequence of the node 5 in general.

Electrical discharge machines and machine tools in general require special safety means for the protection of operator, machine and environment from harm. This is why in a another embodiment a safety manager (SAFETY) is provided in the node 5 where signals relevant to safety come together and also being available for a diagnostic routine and early warning. This central safety manager is independent of other operating functions and designed in accordance with current standards for hardware and software rules and communication paths.

In FIG. 17, provided for process control is a microprocessor (μP) to handle tasks which although complex are less critical in time, such as e.g. algorithms for averaging and filters, mathematical and logical function calculations or timing control of typical sequential events.

In accordance with another embodiment the method of operating an EDM machine is configured so that at least one of processing and communicating data occurs in hierarchical levels, e.g. as regards various speed requirements. For example, the data processing hierarchy is staggered according to a reduction in speed so that data processing and data communication occurs only internally in the modules, from module to module via the programmed logic circuit (COM), from module to module via the programmed logic circuit (COM) and the microprocessor (μP), or between the numerical control (CNC) via the node 5 to all modules.

The advantage of this architecture lies in its optimum selection of location and means for data processing with the object of eliminating delays in communication in speeding up decisions or also simply to reduce costs.

Figure 18:
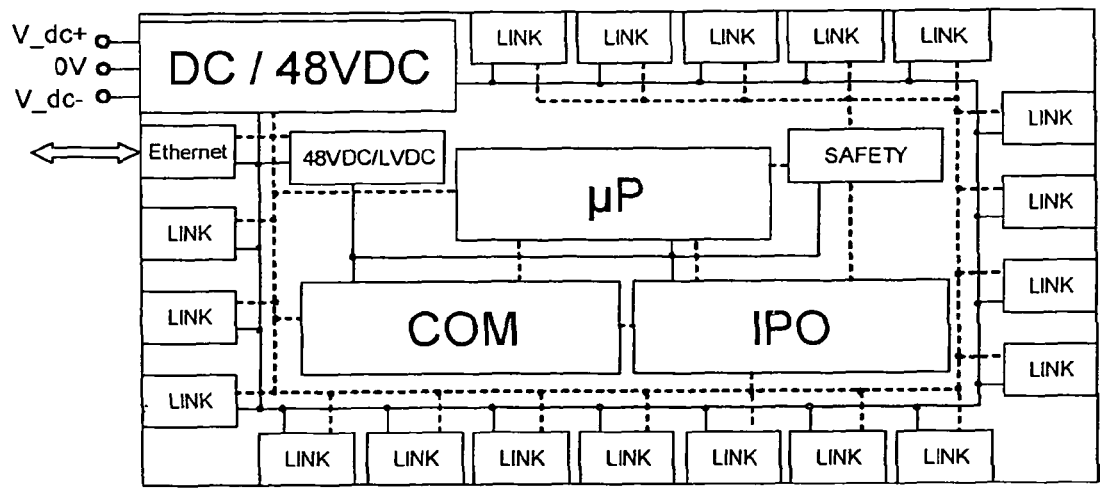
FIG. 18 shows a schematic view of another embodiment of a node in accordance with the invention including an external numerical control.

Referring now to FIG. 18 there is illustrated a further embodiment of the node 5 which consequently implements the aforementioned principle. Unlike the node 5 as shown in FIG. 17, an additional autonomous interpolator (IPO) is provided for path calculation. For example, path control of a wire-cutting EDM machine for any number of axes is subdivided into two machining units: a time-uncritical but computing-intensive coarse interpolator, and a fine interpolator having no time delay which is equipped with a data memory and a controller. This technique decouples the purely geometric task of path calculation from motion implementation both in time and space. This solution is detained in U.S. Pat. No. 4,903,213 (BÜHLER et al.) the content thereof being incorporated herein by reference and to be considered as part of the disclosure. It is being used all the more often for time-critical and complex path control, because it is firstly very fast and secondly extremely low priced.

In accordance with an embodiment, normally employed as the coarse interpolator is a usual personal computer (PC) located on or remote from the machine and which communicates the compressed path data and commands into the memory of the fine interpolator (IPO) via any of the wealth of different media such as internet, local area networks or also memory cards. This thus makes it possible that an internationally active company designs components at its flagship location and sends the conditioned machining data to the machines distributed around the various continents.

The fine interpolator, as described in machine U.S. Pat. No. 4,903,213, comprises in the normal instance a digital configurable logic circuit of the same or similar type as already provided for the controller (EPGA in FIG. 10) in the generator module.

In another embodiment logic circuits are used preferably which already include memory blocks for a further increase in the interpolation speed.

Embodiments for machine tools according to the invention no longer require operator consoles, in place of which simple manual operator devices are employed equipped only with the elements as absolutely necessary for setting, operating and simply trouble-shooting the machine. Such manual operator devices are, of course, significantly cheaper than conventional operator consoles. The manual operator device can be linked like a module to a port of the node 5 from which it is powered. This is especially of advantage for production cells comprising a plurality of such machines, all of which can be programmed and monitored by a single simple personal computer or via a local network.

It is to be understood that the invention is not limited in its application to the details of construction and the arrangement of the components set forth in the above description of embodiments or illustrated in the drawings. The invention is capable of including other embodiments or being carried out for similar machine tools having the same function. Also, it is to be understood that the phraseology and terminology employed herein are for the purpose of description and should not be regarded as limiting.

All publications and existing systems mentioned in this specification are herein incorporated by reference.

Although certain devices and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

Accordingly, the protection sought is set forth in the claims below:

The invention claimed is:

1. A method of operating an electrical discharge machine, the electrical discharge machine configured for machining a workpiece, the method comprising:

at least one of controlling, monitoring and carrying out of the machining of the workpiece by a plurality of configurable modules, said modules being arranged on the machine and being linked by a data network to a node;

at least one of sending data to said node and receiving data from said node by said modules;

receiving, by at least one of said modules, a software configuration instruction from said node, and transforming, by said at least one of said modules, from an electrical discharge machine generator module into a motor drive module according to said received software configuration instruction, said electrical discharge machine generator module being configured to output machining pulses for machining the workpiece, and said motor drive module being configured to output a motor drive current for driving a motor of the electrical discharge machine.

2. The method as set forth in claim 1 wherein said node is adapted to manage data transfer to or from said modules for at least one of controlling and monitoring said modules.

3. The method as set forth in claim 1 wherein said modules comprise at least one of a generator module, a drive module and a machine control module.

4. The method as set forth in claim 1 wherein said modules comprise a generator module, a drive module, a machine control module, a DC module and a power supply module.

5. The method as set forth in claim 1, wherein at least one of said modules is supplied via said data network from said node with a feed voltage for power supply.

6. The method as set forth in claim 5 wherein said modules requiring for proper functioning a power supply of less than 50 W are powered exclusively via said data network from said node.

7. The method as set forth in claim 5 wherein said modules requiring for proper functioning a power supply of 50 W or more are additional powered by a suitable high DC voltage via a cable from said DC module.

8. The method as set forth in claim 7 wherein excess energy materializing in at least one module is stored in one or more capacitors connected to said high DC voltage and said stored energy is made use of in the module itself.

9. The method as set forth in claim 8 wherein said stored energy is made use of in another of said modules.

10. The method as set forth in claim 8, wherein said stored energy is returned from DC module via a power supply module into a power supply system and can be made use of by other consumers of said system.

11. The method as set forth in claim 1, wherein at least one of said modules comprises a configurable controller receiving via said node and the data network configuration data by means of which said module can be set to implement a predetermined function.

12. The method as set forth in claim 11 wherein said configurable controller fixedly defines an area for configuring said module, this area providing at least the communication with said node and an identification message to said node.

13. The method as set forth in claim 12 wherein said identification message is sent to said node as soon as the feed voltage supplied via said data network and supply voltages derived therefrom lie within a defined tolerance.

14. The method as set forth in claim 12 wherein after having received said identification message a selection of said configuration data is made, as derived therefrom, and the controller of the corresponding module is configured in a variable range via said node and said data network.

15. The method as set forth in claim 12 wherein said modules communicate at least one of their properties, operating data and fabrication data via said identification message.

16. The method as set forth in claim 12 wherein at least one of said modules is reconfigured in response to given requirements on a machining process during operation of said machine tool in the variable area of said configuration.

17. The method as set forth in claim 11 wherein after being configured in said variable range at least one of said modules satisfies the functions of a generator of a die-sinking electrical discharge machining machine.

18. The method as set forth in claim 11 wherein after being configured in said variable range at least one of said modules satisfies the functions of a generator of a wire-cutting electrical discharge machining machine.

19. The method as set forth in claim 11 wherein after being configured in said variable range at least one of said modules satisfies the functions of a drive module for motors and similar loads of a machine tool.

20. The method as set forth in claim 1 wherein said node is connected via at least one standardized interface to a numerical control, said numerical control performing at least one of coordinating, controlling and monitoring of said machine via said interface.

21. The method as set forth in claim 1 wherein at least one of processing and communicating data occurs in hierarchical levels as regards speed requirements such that the data processing hierarchy is staggered according to a reduction in speed, and at least one of open and closed loop control functions are implemented internally in at least one of said modules for a top speed requirement by one or more modules and a programmable logic circuit arranged in said node for a second speed requirement, and by one or more modules and a programmable logic circuit arranged in said node and a microprocessor arranged in said node for a third speed requirement.

22. The method as set forth in claim 1 wherein provided in said node is a stand-alone fine interpolator comprising a memory and a controller, said stand-alone fine interpolator receiving via a standardized interface from a coarse interpolator at least one of conditioned geometry data and control commands, storing it in said memory and performing at least one of coordinating, controlling and monitoring said machine with no delay in response to said stored geometry data or control commands.

23. The method as set forth in claim 22 wherein setting up, operating or trouble-shooting said machine is done with a manual operator device connected to the node and powered by said node.

24. The method of claim 1, wherein said modules are linked by a serial data network to said node.

25. An electrical discharge machining system, comprising a machine for machining a workpiece and a plurality of configurable modules, wherein at least one of controlling, monitoring and carrying out of the machining of the workpiece is performed by said modules, wherein said modules are arranged on the machine, and said modules are linked by a data network to a node for at least one of sending data to said node and receiving data from said node, and at least one of said modules is configured to transform from an electrical discharge machine generator module that is configured to output machining pulses for machining the workpiece into a motor drive module that is configured to output a motor drive current for driving a motor of the electrical discharge machine by a software configuration instruction communicated to said at least one module from said node.

26. The electrical discharge machining system as set forth in claim 25 wherein said data network is a star network relative to said node.

27. The electrical discharge machining system as set forth in claim 25 wherein said node comprises a plurality of configurable ports.

28. The electrical discharge machining system as set forth in claim 25 wherein said node comprises a source for powering at least one of said modules via said data network.

29. The electrical discharge machining system as set forth in claim 25 wherein said node provides a plurality of standardized ports for a local area network.

30. The electrical discharge machining system as set forth in claim 25 wherein said modules comprise a generator module, a drive module and a machine control module.

31. The electrical discharge machining system as set forth in claim 30, wherein said drive module further comprises a motor forming an assembly.

32. The electrical discharge machining system as set forth in claim 25 wherein said modules comprise a generator module, a drive module, a machine control module, a DC module and a power supply module.

33. The electrical discharge machining system as set forth in claim 32 wherein at least one of the drive modules is arranged in the vicinity of an axis motor.

34. The electrical discharge machining system as set forth in claim 32 wherein at least one of said generator module and a module for monitoring a spark gap is arranged in the vicinity of a working gap formed between a machining electrode and the workpiece in said electrical discharge machining system.

35. The electrical discharge machining system as set forth in claim 25 wherein said node comprises a plurality of standardized configurable ports.

36. The electrical discharge machining system as set forth in claim 35 wherein at least one of said configurable ports is configurable in response to an identification message of the associated module.

37. The electrical discharge machining system as set forth in claim 25 wherein excess energy materializing in at least one module is stored in one or more capacitors connected to said high DC voltage and said stored energy is made use of in the module itself.

38. The electrical discharge machining system as set forth in claim 25 wherein at least one of said modules comprises a configurable controller receiving via said node and the data network configuration data by means of which said module can be set to implement a predetermined function.

39. The electrical discharge machining system as set forth in claim 38 wherein said configurable controller fixedly defines an area for configuring said module, this area providing at least the communication with said node and an identification message to said node.

40. The electrical discharge machining system as set forth in claim 25 wherein said node is connected via at least one standardized interface to a numerical control, said numerical control performing at least one of coordinating, controlling and monitoring said machine via said interface.

41. The electrical discharge machining system as set forth in claim 25 further comprising in said node a stand-alone fine interpolator comprising a memory and a controller, said stand-alone fine interpolator receiving via a standardized interface from a coarse interpolator at least one of conditioned geometry data and control commands, storing it in said memory and performing at least one of coordinating, controlling and monitoring said machine with no delay in response to said stored geometry data or control commands.

42. The electrical discharge machining system of claim 25, wherein said modules are linked by a serial data network to said node.

43. The electrical discharge machining system as set forth in claim 25, further comprising a generator module for generating pulses by means of discharging pulse capacitors, said generator module comprising: a data link to said node which also provides a feed voltage input, a programmable controller, a bipolar current source, at least one charge and discharge circuit for at least one pulse capacitor comprising a sensor, and one or more inverter circuits including one or more isolating transformer(s).

44. The electrical discharge machining system as set forth in claim 43 wherein in addition a DC voltage input is provided for the supply with increased power and for exchanging excess energy with other modules.

45. The electrical discharge machining system as set forth in claim 43 wherein said bipolar current source and said charge and discharge circuit are designed for bidirectional energy flow for returning excess energy materializing in a module to said DC voltage input.

46. The electrical discharge machining system as set forth in claim 43 wherein said programmable controller is designed so that it comprises a hardwired configuration area via which the communication with said node and an identification message to said node is assured.

47. The electrical discharge machining system as set forth in claim 46 wherein said programmable controller is designed so that after configuration of said node it receives via said data link at least one of control commands, setting data, setpoint values and timing signals to control said generator module during operation of the machine tool.

48. The electrical discharge machining system as set forth in claim 46 wherein said programmable controller is designed so that after configuration of said node it sends via said data link and said node at least one of measurement values, operating data, timing signals, alarms and trouble-shooting information to warn, and/or to inform and/or to coordinate and/or to control other modules and/or said numerical control during operation.

49. The electrical discharge machining system as set forth in claim 43 wherein said programmable controller is designed so that it comprises a variable configuration area via which programmed functions of said module are defined, and/or coordinated.

50. The electrical discharge machining system as set forth in claim 43 wherein said module is shielded from the environment by a case.

* * * * *

UNITED STATES PATENT AND TRADEMARK OFFICE
CERTIFICATE OF CORRECTION

PATENT NO. : 8,369,980 B2
APPLICATION NO. : 11/496340
DATED : February 5, 2013
INVENTOR(S) : Ernst Buhler et al.

It is certified that error appears in the above-identified patent and that said Letters Patent is hereby corrected as shown below:

In the Specification

Column 1, line 66, after "installed" delete "and".

Column 2, line 42, delete "C1" and insert --$C_1$--.

Column 2, line 42, delete "Q1" and insert --$Q_1$--.

Column 2, line 43, delete "L3" and insert --$L_3$--.

Column 2, line 43, delete "Q2" and insert --$Q_2$--.

Column 2, line 44, delete "C1" and insert --$C_1$--.

Column 2, line 44, delete "L2" and insert --$L_2$--.

Column 2, line 45, after "this" delete "is".

Column 2, line 54, delete "Q1" and insert --$Q_1$--.

Column 2, line 61, delete "detained" and insert --detailed--.

Column 3, line 18, delete "L3" and insert --$L_3$--.

Signed and Sealed this
Seventeenth Day of September, 2013

Teresa Stanek Rea
*Deputy Director of the United States Patent and Trademark Office*

CERTIFICATE OF CORRECTION (continued)
U.S. Pat. No. 8,369,980 B2

Column 4, line 20, delete "an" and insert --a--.

Column 6, line 4, delete "an" and insert --a--.

Column 6, line 52, after "workpiece" delete "a".

Column 6, line 60, after "the" delete "a".

Column 11, line 28, after "eliminating" delete "is".

Column 12, line 26, delete "(FGPA)" and insert --(FPGA)--.

Column 12, line 58, after "switching" delete "is".

Column 16, line 66, delete "one" and insert --on--.

Column 17, lines 54-55, after "modules," delete "from module to module via the programmed logic circuit (COM),".

Column 18, line 7, delete "detained" and insert --detailed--.

Column 18, line 26, delete "EPGA" and insert --FPGA--.

UNITED STATES PATENT AND TRADEMARK OFFICE
CERTIFICATE OF CORRECTION

PATENT NO. : 8,369,980 B2  
APPLICATION NO. : 11/496340  
DATED : February 5, 2013  
INVENTOR(S) : Buhler et al.

Page 1 of 1

It is certified that error appears in the above-identified patent and that said Letters Patent is hereby corrected as shown below:

The Title page, Item no. (73) Should read as follows:

--AGIE CHARMILLES SA--

Signed and Sealed this  
Twenty-eighth Day of January, 2014

Michelle K. Lee  
*Deputy Director of the United States Patent and Trademark Office*